2,980,686
9-(N-SUBSTITUTED-ω-AMINOALKYL)-PYRID [3,4-b]INDOLES AND INTERMEDIATE

Richard A. Robinson, Evanston, Ill., assignor to G. D. Searle & Co., Chicago, Ill., a corporation of Delaware No Drawing. Filed Apr. 15, 1959, Ser. No. 806,446

10 Claims. (Cl. 260—296)

This invention relates to novel heterocyclic nitrogen compounds and more particularly to 9-pyrid-[3,4-b]-indoles which contain an N-substituted-ω-amino-alkyl substituent in the 9-position and also to a novel intermediate in the preparation of same. Alternate names which can be used to indicate the parent ring structure of the present compounds are β-carboline and norharman. The compounds of the present invention can be represented by the structural formula

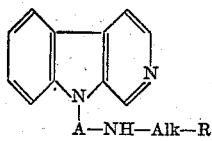

A—NH—Alk—R wherein A is an alkylene radical containing fewer than 5 carbon atoms, Alk is an alkylene radical containing fewer than 4 carbon atoms and optionally substituted by an hydroxyl group, and R is selected from the group consisting of methoxyphenyl, dimethoxyphenyl, trimethoxyphenyl, phenyl, halophenyl, aminophenyl, dihydroxyphenyl, and dibenzyloxyphenyl radicals.

The lower alkylene radicals which may be represented by A are, for example:

—$CH_2$-(methylene)
—$CH_2CH_2$-(ethylene)
—$CH_2CH_2CH_2$-(trimethylene)

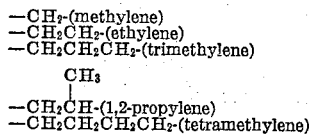

—$CH_2CH$-(1,2-propylene)
—$CH_2CH_2CH_2CH_2$-(tetramethylene)

The term "Alk" as defined herein is exemplified by the following groups:

—$CH_2$-(methylene)
—$CH_2CH_2$-(ethylene)
—$CH_2CH_2CH_2$-(trimethylene)

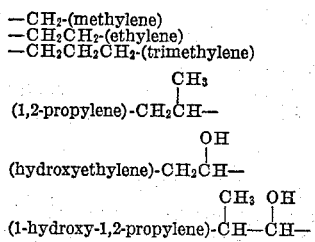

(1,2-propylene)-$CH_2CH$—

(hydroxyethylene)-$CH_2CH$—

(1-hydroxy-1,2-propylene)-$CH$—$CH$—

Also encompassed by this invention are the non-toxic salts of the aforementioned organic bases, as exemplified by the hydrochloride, hydrobromide, hydroiodide, tartrate, succinate, malate, acetate, citrate, ascorbate, nitrate, sulfate, phosphate, and sulfamate.

Suitable starting materials for the manufacture of the compounds of this invention are 9-(ω-aminoalkyl)-9-pyrid[3,4-b]indoles. A preferred embodiment of this invention is the group of compounds derived from 9-(3-aminopropyl)-9-pyrid[3,4-b]indole. The latter can be prepared by reduction of 9-(2-cyanoethyl)-9-pyrid[3,4-b]-indole, for example by hydrogenation in the presence of a Raney nickel-platinum oxide catalyst.

The instant 9-(N-substituted-ω-aminoalkyl)-9-pyrid[3,4-b]indoles can be prepared by reacting the aforementioned 9-(ω-aminoalkyl)-9-pyrid[3,4-b]indoles with the appropriate carbonyl compound and a platinum oxide catalyst in an atmosphere of hydrogen of approximately 15–45 pounds per square inch. As a specific example of the process involved, 9-(3-aminopropyl)-9-pyrid[3,4-b]indole is treated with 3-methoxybenzaldehyde and a platinum oxide catalyst in a hydrogen atmosphere to yield 9-[3-(methoxybenzylamino)propyl]-9-pyrid[3,4-b]indole. Reaction of an ether solution of this base with hydrogen chloride affords the corresponding dihydrochloride.

The preferred process for the preparation of the instant compounds in which R is an aminophenyl moiety involves the use of a nitrophenyl carbonyl intermediate. Thus, the nitro group is reduced during the reaction.

The compounds of this invention in which R is a dihydroxyphenyl group are conveniently prepared by hydrogenolysis of the corresponding dibenzyloxyphenyl compounds. For example, 9 - [3 - (3,4-dibenzyloxy-α-methylphenethylamino)propyl]-9-pyrid[3,4 - b]indole in methanol is reacted with hydrogen at 1–3 atmospheres pressure in the presence of a 10% palladium-on-carbon catalyst to afford 9-[3-(3,4-dihydroxy-α-methylphenethyl-amino)propyl]-9-pyrid[3,4-b]indole.

The 9-(N-substituted-ω-aminoalkyl) - 9 - pyrid[3,4-b]-indoles of this invention are useful as a result of their valuable pharmacological properties. They have, for example, the ability to potentiate the sleep-producing activity of barbiturate sedatives. They are also anti-inflammatory agents, as evidenced by their ability to inhibit the local edema formation associated with inflammatory states. In addition, they are hypotensive agents.

As is demonstrated supra, 9-(3-aminopropyl)-9-pyrid-[3,4-b]indole is useful as an intermediate in the manufacture of the 9-(N-substituted-3-aminopropyl)-9-pyrid-[3,4-b]indoles of this invention.

This invention will appear more fully from the examples which follow. These examples are set forth by way of illustration only and it will be understood that the invention is not to be construed as limited in spirit or in scope by the details contained therein as many modifications in materials and methods will be apparent in this disclosure to those skilled in the art. In these examples, temperatures are given in degrees centigrade (° C.). Pressures are designated as pounds per square inch (p.s.i.). Quantities of materials are expressed in parts by weight unless otherwise noted.

EXAMPLE 1

*9-(3-aminopropyl)-9-pyrid[3,4-b]indole*

A mixture of 5.5 parts of 9-(2-cyanoethyl)-9-pyrid[3,4-b]indole, 2 parts of anhydrous potassium carbonate, 5 parts of Raney nickel catalyst, 0.15 part of platinum oxide, and 200 parts of methanol is shaken in an atmosphere of hydrogen at a pressure of 15–45 p.s.i. until 2 molecular equivalents of hydrogen are absorbed. The reaction mixture is filtered to remove the catalyst, then concentrated in vacuo to a viscous oil. This oil is purified by dissolution in dilute hydrochloric acid, filtration of the resultant mixture to remove insoluble material, basification of the filtrate with sodium hydroxide, extraction of the liberated base into ether, evaporation of the ether and finally distillation at 180–190°/0.01 mm. to afford 9-(3-aminopropyl)-9-pyrid[3,4-b]indole.

An isopropanol solution of 9-(3-aminopropyl)-9-pyrid-[3,4-b]indole is treated with a solution of hydrogen chloride in isopropanol. The resultant precipitate is recrystallized from methanol to yield 9-(3-aminopropyl)-9-pyrid-[3,4-b]indole dihydrochloride, M.P. 325°.

EXAMPLE 2

*9-[3-(3-methoxybenzylamino)propyl]-9-pyrid-[3,4-b]indole*

A mixture of 11.2 parts of 9-(3-aminopropyl)-9-pyrid-[3,4-b]indole, 7 parts of 3-methoxybenzaldehyde, 0.3 part of platinum oxide, and 200 parts of methanol is stirred under hydrogen at one atomsphere of pressure until one molecular equivalent of hydrogen is absorbed. The catalyst is removed by filtration and the solvent distilled at reduced pressure to afford the oily free base, 9-[3-(3-methoxybenzylamino)propyl]-9-pyrid[3,4-b]indole.

An ether solution of the oily base is treated with an isopropanol solution of hydrogen chloride resulting in the precipitation of the crude dihydrochloride. Recrystallization from methanol affords 9-[3-(3-methoxybenzylamino)propyl] - 9 - pyrid[3,4-b]indole dihydrochloride, M.P. 242°.

EXAMPLE 3

*9-[3-(3,4,5-trimethoxybenzylamino)propyl]-9-pyrid[3,4-b]indole*

By substituting a mixture of 22.1 parts of 9-(3-aminopropyl)-9-pyrid[3,4-b]indole, 20 parts of 3,4,5-trimethoxybenzaldehyde, 0.4 part of platinum oxide, and 200 parts of methanol in the process described in Example 2; 9-[3-(3,4,5-trimethoxybenzylamino)propyl] - 9 - pyrid-[3,4-b]indole and its dihydrochloride, M.P. 260°, are obtained.

EXAMPLE 4

*9-[3-(4-methoxybenzylamino)propyl]-9-pyrid-[3,4-b]indole*

By substituting 4-methoxybenzaldehyde for 3-methoxybenzaldehyde in the process in Example 2, 9 - [3 - (4-methoxybenzylamino)propyl] - 9 - pyrid[3,4-b]indole and its dihydrochloride, M.P. 232°, are obtained.

EXAMPLE 5

*9-[3-(3-chlorobenzylamino)propyl]-9-pyrid-[3,4-b]indole*

Substituting of 3-chlorobenzaldehyde for 3-methoxybenzaldehyde in the procedure of Example 2 affords 9-[3-(3-chlorobenzylamino)propyl] - 9 - pyrid[3,4-b]indole and its dihydrochloride, M.P. 100°.

By substituting an equivalent quantity of 3-iodobenzaldehyde and otherwise proceeding according to the herein described processes, 9-[3-(3-iodobenzylamino)propyl]-9-pyrid[3,4-b]indole is obtained. It exhibits maxima in the ultraviolet at about 289 and about 304 millimicrons.

EXAMPLE 6

*9-[3-(4-aminobenzylamino)propyl]-9-pyrid-[3,4-b]indole*

A mixture of 22.1 parts of 9-(3-aminopropyl)-9-pyrid-[3,4-b]indole, 15 parts of 4-nitrobenzaldehyde, and 75 parts of methanol is allowed to stand at room temperature for 30 minutes; then added to a mixture of 0.4 part of platinum oxide and 150 parts of methanol. The resultant mixture is shaken in a hydrogen atmosphere of approximately 15 p.s.i. pressure until 4 molecular equivalents of hydrogen are absorbed. The reaction mixture is treated according to the isolation scheme described in previous examples to afford the free base, 9-[3-(4-aminobenzylamino)propyl]-9-pyrid[3,4-b]indole and the corresponding trihydrochloride, M.P. 235–240°.

EXAMPLE 7

*9-[3-(β-hydroxy-α-methylphenethylamino)propyl]-9-pyrid[3,4-b]indole*

To a mixture of 33 parts of 9-(3-aminopropyl)-9-pyrid-[3,4-b]indole, 30 parts of (1—)1-hydroxy-1-phenylpropanone-2 and 200 parts of methanol is added 0.4 part of platinum oxide and the resultant mixture is shaken under one atmosphere of hydrogen pressure until one molecular equivalent of hydrogen is absorbed. The catalyst is removed by filtration and the solvent by evaporation in vacuo, resulting in an oily reside. The residue is dissolved in ether and the ether solution treated with solid carbon dioxide to precipitate the carbonate of unreacted 9-(3-aminopropyl) - 9 - pyrid[3,4-b]indole. Removal of the precipitate by filtration and evaporation of the solvent yields 9 - [3 - (β-hydroxy-α-methylphenethylamino)propyl]-9-pyrid-[3,4-b]indole represented by the structural formula:

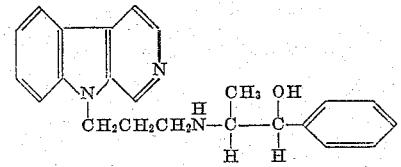

Treatment of an ether solution of the latter base with propanolic hydrogen chloride affords the dihydrochloride, M.P. about 200°.

EXAMPLE 8

*9-[3-(3,4-dimethoxy-α-methylphenethylamino)-propyl]-9-pyrid[3,4-b]indole*

A mixture of 55 parts of 9-(3-aminopropyl)-9-pyrid-[3,4-b]indole, 48 parts of 3,4-dimethoxyphenylacetone, 0.5 part of platinum oxide and 300 parts of methanol is hydrogenated under the conditions described in Example 7. Removal of the catalyst and solvent by the usual procedure yields 9-[3-(3,4-dimethoxy - α - methylphenethylamino)propyl] - 9 - pyrid[3,4-b]indole whose structural formula is shown below:

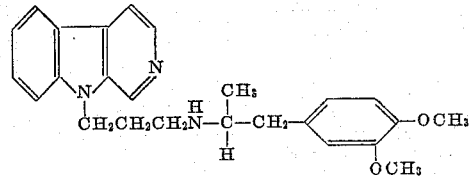

Its dihydrochloride, M.P. 256°, is prepared in the usual manner.

EXAMPLE 9

*9-[3-(3,4-dibenzyloxy-α-methylphenethylamino)-propyl]-9-pyrid[3,4-b]indole*

A mixture of 35 parts of 9-(3-aminopropyl)-9-pyrid-[3,4-b]indole, 52 parts of 3,4-dibenzyloxyphenylacetone, 0.5 part of platinum oxide, and 250 parts of methanol is hydrogenated at 15–45 p.s.i. until one molecular equivalent of hydrogen is absorbed. Isolation of the product by the procedure described in previous examples results in 9 - [3-(3,4-dibenzyloxy-α-methylphenethylamino)propyl]-9-pyrid[3,4-b]indole and its dihydrochloride, M.P. 203°.

EXAMPLE 10

*9-[3-(3,4-dihydroxy-α-methylphenethylamino)propyl]-9-pyrid[3,4-b]indole dihydrochloride*

A mixture of 12 parts of 9-[3-(3,4-dibenzyloxy-α-methylphenethylamino)propyl]-9-pyrid[3,4-b]indole dihydrochloride, 1 part of 10% palladium-on-carbon catalyst, and 200 parts of methanol is shaken in a hydrogen atmosphere at a pressure of 1–3 atmospheres. The reaction mixture is filter to remove the catalyst and distilled to remove the solvent. The residue is dissolved in water, and the aqeuous solution washed with n-butanol, then evaporated to dryness in vacuo. Crystallization of the residue from isopropanol yields 9-[3-(3,4-dihydroxy-α-methylphenethylamino)propyl]-9-pyrid[3,4-b]indole dihydrochloride, M.P. 125°.

EXAMPLE 11

9-[3-(3,4-dibenzyloxy-β-hydroxy-α-methylphenethylamino)propyl]-9-pyrid[3,4-b]indole A mixture of 22 parts of 9-(3-aminopropyl)-9-pyrid-[3,4-b]indole, 37 parts of (1—)1-(3,4-dibenzyloxyphenyl)-1-hydroxypropanone-2, 0.5 part of platinum oxide, and 250 parts of methanol is shaken in a hydrogen atmosphere at 15–45 p.s.i. pressure until one equivalent of hydrogen is absorbed. Treatment of the mixture in the usual manner affords 9-[3-(3,4-dibenzyloxy-β-hydroxy-α-methylphenethylamino)propyl]-9-pyrid[3,4 - b]-indole. Its dihydrochloride has a M.P. of about 180°.

EXAMPLE 12

9-[3-(β,3,4-trihydroxy-α-methylphenethylamino)-propyl]-9-pyrid[3,4-b]indole dihydrochloride A mixture of 55 parts of 9-[3-(3,4-dibenzyloxy-α-hydroxy-β-methylphenethylamino)propyl] - 9-pyrid[3,4-b]indole dihydrochloride, 1 part of 10% palladium-on-carbon catalyst, and 250 parts of methanol is hydrogenated at 15–45 p.s.i. in the usual manner. Isolation of the product by the procedure described in Example 10 yields 9 - [3-(β,3,4-trihydroxy-α-methylphenethylamino)-propyl]-9-pyrid[3,4-b]indole dihydrochloride. It exhibits maxima in the ultraviolet at about 289 and about 304 millimicrons.

EXAMPLE 13

9-[3-(β,3,4-trihydroxylphenethylamino)propyl]-9-pyrid[3,4-b]indole dihydrochloride A mixture of 22 parts of 9-(3-aminopropyl)-9-pyrid-[3,4-b]indole, 35 parts of 3,4-dibenzyloxyphenylglyoxal, 0.5 part of platinum oxide, and 250 parts of methanol is shaken in a hydrogen atmosphere at 30–45 p.s.i. until two molecular equivalents of hydroben are absorbed. The catalyst is removed by filtration and the filtrate evaporated to dryness in vacuo to afford 9-[3-(β,3,4-trihydroxyphenethylamino)propyl] - 9 - pyrid[3,4-b]indole. Dissolution of the latter in isopropanol followed by treatment with propanolic hydrogen chloride yields the corresponding dihydrochloride, M.P. about 162°.

A mixture of 50 parts of 9-[3-(β,3,4-trihydroxyphenethylamino)propyl]-9-pyrid[3,4 - b]indole dihydrochloride, 1 part of 10% palladium-on-carbon catalyst, and 250 parts of methanol is shaken in a hydrogen atmosphere at 30–45 p.s.i. until two molecular equivalents of hydrogen are absorbed. The catalyst and solvent are removed in the manner specified above and the residue recrystallized from a methanol-isopropanol solution to yield 9-[3-(β-3,4-trihydroxyphenethylamino)propyl]-9-pyrid[3,4-b]indole dihydrochloride, M.P. about 135°.

What is claimed is:
1. 9-[3 - (3 - methoxybenzylamino)propyl] - 9 - pyrid[3,4-b]indole.
2. 9-[3 - (3,4,5 - trimethoxybenzylamino)propyl] - 9-pyrid[3,4-b]indole.
3. 9-[3 - (3 - chlorobenzylamino)propyl] - 9 - pyrid[3,4-b]indole.
4. 9-[3 - (4 - aminobenzylamino)propyl] - 9 - pyrid[3,4-b]indole.
5. 9-[3 - (β - hydroxy - α - methylphenethylamino)-propyl]-9-pyrid[3,4-b]indole.
6. 9-[3 - (3,4 - dimethoxy-α-methylphenethylamino)-propyl]-9-pyrid[3,4-b]indole.
7. 9-[3 - (3,4 - dibenzyloxy - α - methylphenethyl)-propyl]-9-pyrid[3,4-b]indole.
8. 9 - [3 - (3,4 - dihydroxy-α-methylphenethylamino)-propyl]-9-pyrid[3,4-b]indole.
9. 9-[3 - (β,3,4 - trihydroxy - α - methylphenethylamino)propyl]-9-pyrid[3,4-b]indole.
10. A compound of the formula

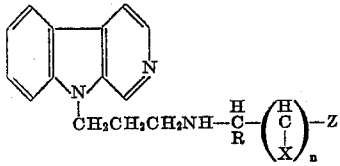

wherein R is selected from the group consisting of hydrogen and methyl, X is a member of the class consisting of hydrogen and hydroxy groups, $n$ is selected from the group consisting of 0 and 1, and Z is selected from the group of radicals consisting of monomethoxyphenyl, dimethoxyphenyl, trimethoxyphenyl, monohalophenyl, monoaminophenyl, phenyl, dibenzyloxyphenyl, and dihydroxyphenyl.

References Cited in the file of this patent
UNITED STATES PATENTS
2,767,179    Cavallito et al. _____ Oct. 16, 1956